United States Patent [19]

Ota et al.

[11] 4,305,995

[45] Dec. 15, 1981

[54] MAGNETIC RECORDING MEDIUM

[75] Inventors: Hiroshi Ota; Eiji Horigome; Hitoshi Azegami, all of Tokyo, Japan

[73] Assignee: TDK Electronics Co., Ltd., Tokyo, Japan

[21] Appl. No.: 175,531

[22] Filed: Aug. 5, 1980

[30] Foreign Application Priority Data

Aug. 29, 1979 [JP] Japan .............................. 54-109990

[51] Int. Cl.$^3$ ............................................ B32B 27/40
[52] U.S. Cl. ................................. 428/423.1; 428/694; 428/900
[58] Field of Search ............................... 427/127–132, 427/48; 428/900, 694, 423.1

Primary Examiner—Bernard D. Pianalto
Attorney, Agent, or Firm—Oblon, Fisher, Spivak, McClelland & Maier

[57] ABSTRACT

A magnetic recording medium comprises a substrate coated with a magnetic layer comprising a magnetic powder, a thermosettable binder and a mixture of sorbitane mono-, di- and tri- higher fatty acid ester surfactants.

4 Claims, 2 Drawing Figures

MAGNETIC RECORDING MEDIUM

BACKGROUND OF THE INVENTION

1. Field of the Invention

The present invention relates to an improvement of a magnetic recording medium such as a magnetic tape and a flexible disc. More particularly, it relates to a magnetic recording medium which smoothly runs in high stable condition even in severe environment at high temperature and high humidity and has high magnetic orientation degree.

2. Description of the Prior Arts

The magnetic recording medium is usually obtained by coating a magnetic powder composition as a mixture of a magnetic powder and a binder with an organic solvent on a substrate for a tape or a sheet. In the conventional magnetic recording medium, the magnetic powder is peeled off by friction between the magnetic layer and a head of a recorder so as to adhere the magnetic powder on a head of a recorder whereby reproduction characteristics in high tone region are deteriorated. In order to overcome such disadvantages, a lubricant is incorporated into a magnetic powder composition so as to increase the effect of lubrication of the magnetic powder composition and to decrease a friction between the magnetic powder membrane and the head of the recorder. The effect of lubrication of the incorporation of the conventional lubricant at a low temperature is unsatisfactorily low. It has been required to improve such characteristics for a magnetic recording medium used in a severe environment at a high temperature and high humidity such as a magnetic tape used for a car stereo recorder.

SUMMARY OF THE INVENTION

It is an object of the present invention to provide a magnetic recording medium which can be smoothly run in highly stable condition even in a severe environment at high temperature and high humidity and has high magnetic orientation degree.

The foregoing and other objects of the present invention have been attained by providing a magnetic recording medium which comprises a substrate coated with a magnetic layer wherein a magnetic powder is orientated in a thermosettable binder and a mixture of sorbitane mono-, di- and tri- higher fatty acid ester surfactants.

DETAILED DESCRIPTION OF THE PREFERRED EMBODIMENTS

Figure 1:
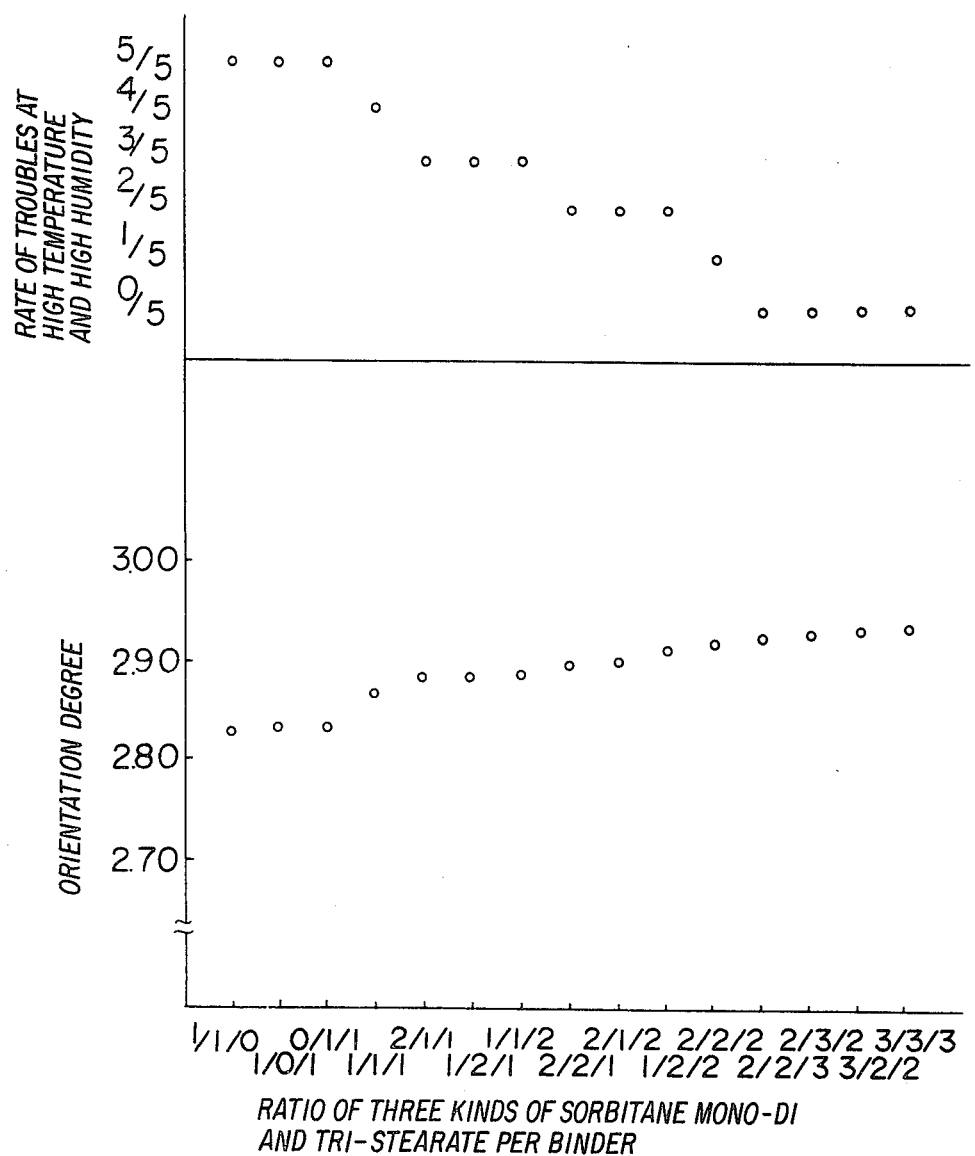
FIG. 1 shows orientation degrees and rates of troubles of the magnetic recording media of the present invention.

The sorbitane higher fatty acid ester surfactants are esters of sorbitol and higher fatty acid such as stearic acid. Number of OH groups in the sorbitane higher fatty acid ester surfactants such as sorbitane stearates is decreased in order of sorbitane mono-stearate, sorbitane distearate and sorbitane tristearate. Hydrophobic property is increased in the same order and the dispersibility of the magnetic powder is decreased in the same order. When the sorbitane higher fatty acid ester surfactants especially sorbitane stearates are blended to a thermosettable binder before the thermosetting in the preparation of the magnetic recording medium such as the magnetic tape, excellent effect as the lubricant is found.

In view of the finding, sorbitane mono-, di- and tri-fatty acid esters especially sorbitane monostearate, sorbitane distearate and sorbitane tristearate are combined to incorporate in the thermosettable binder type magnetic composition and a magnetic recording medium is prepared by using the magnetic composition. The magnetic recording medium can smoothly run in highly stable condition even in a severe environment at high temperature and high humidity and has high magnetic orientation degree. As the sorbitane higher fatty acid ester surfactants, a mixture of sorbitane monostearate, distearate and tristearate will be illustrated.

Ratios of sorbitane monostearate, sorbitane distearate and sorbitane tristearate are preferably in a range of 1:0.2 to 5:0.2 to 5. A ratio of total amounts of sorbitane monostearate, distearate and tristearate to the binder is in a range of 1 to 15 wt.% especially 2 to 10 wt.%. The optimum ratio of each of sorbitane monostearate, distearate and tristearate is in a range of about 2 to 3 wt.% to the binder.

The binders used in the present invention are thermosettable binders which can be formed by incorporating a crosslinking agent such as a polyisocyanate in the conventional binder such as polyurethane, nitrocellulose and copolymers of vinyl chloride-vinyl acetate and/or vinyl alcohol and the other thermoplastic or thermosettable resins. The magnetic powders can be the conventional magnetic powders. These binders and magnetic powders are described in detail in the prior art and applications and accordingly, the description of the binders and the magnetic powders is not repeated.

The following prior patents and applications are referred as the descriptions of the binders and the magnetic powders. U.S. Pat. No. 4,115,290, G.B. Patent Publications 2,017,117A, 2,021,126A and patent applications U.S. Ser. No. 109,032, West German P 3,001,451, U.K. 8001322 and Netherland 800061 and Japanese Patent Application 79937/1979.

A mixture of sorbitane mono-, di- and tri- fatty acid esters especially stearates should be incorporated before a thermosetting step and can be incorporated in a preparation of the resin solution or in a mixing of the magnetic powder or after a preparation of the magnetic powder composition though it is usually incorporated with the binder.

The present invention will be further illustrated by certain examples and references which are provided for purposes of illustration only and are not intended to be limiting the present invention.

EXAMPLE

The formulations of the basic magnetic composition used in the examples and the references are as follows.

| Composition A: | |
|---|---|
| γ-Fe$_2$O$_3$ powder (cobalt-adsorbed) | 100 wt. parts |
| Vinyl chloride-vinyl acetate copolymer (more than 10% vinyl alcohol component) (OH-DEX manufactured by Denki Kagaku Kogyo Co.) | 20 wt. parts |
| Polyester resin (Desmophene 2220 manufactured by Nippon Polyurethane Co.) | 13 wt. parts |
| Methyl ethyl ketone | 100 wt. parts |

| -continued | |
|---|---|
| Methyl isobutyl ketone | 100 wt. parts |
| Toluene | 100 wt. parts |
| Composition B: | |
| $\gamma$-Fe$_2$O$_3$ powder (cobalt adsorbed) | 100 wt. parts |
| Vinyl chloride-vinyl acetate copolymer (OH-DEX) | 20 wt. parts |
| Polyurethane (Nippolan 5033 manufactured by Nippon Polyurethane Co.) | 13 wt. parts |
| Methyl ethyl ketone | 100 wt. parts |
| Methyl isobutyl ketone | 100 wt. parts |
| Toluene | 100 wt. parts |
| Composition C: | |
| $\gamma$-Fe$_2$O$_3$ powder (cobalt adsorbed) | 100 wt. parts |
| Vinyl chloride-vinyl acetate copolymer (S-LECA manufactured by Sekisui Kagaku Kogyo Co.) | 23 wt. parts |
| Polyurethane (Estane 5715 B. F. Goodrich Chemical Company) | 10 wt. parts |
| Methyl ethyl ketone | 100 wt. parts |
| Methyl isobutyl ketone | 100 wt. parts |
| Toluene | 100 wt. parts |
| Composition D: | |
| $\gamma$-Fe$_2$O$_3$ powder (cobalt adsorbed) | 100 wt. parts |
| Vinyl chloride-vinyl acetate copolymer (more than 10% vinyl alcohol component) (OH-DEX manufactured by Denki Kagaku Kogyo Co.) | 23 wt. parts |
| Polyester (Desmophene 1800 manufactured by Sumitomo-Bayer Co.) | 10 wt. parts |
| Methyl ethyl ketone | 100 wt. parts |
| Methyl isobutyl ketone | 100 wt. parts |
| Toluene | 100 wt. parts |

A mixture of sorbitane monostearate, sorbitane distearate and sorbitane tristearate was incorporated in each of Compositions A to D at ratios shown in FIG. 1. The mixture was thoroughly mixed to disperse the magnetic powder in a ball-mill and 5 wt. part of a polyfunctional aromatic isocyanate (Desmodule L manufactured by Sumitomo-Bayer Co.) as the crosslinking agent was incorporated and uniformly mixed. Each magnetic composition was coated in a thickness of about 6$\mu$ (in dry) on a polyethyleneterephthalate film having a thickness of 12$\mu$. The surface of the magnetic layer is processed by a super-calender and then heat-treated at 60° C. for 48 hr. and the product was cut to obtain each magnetic tape.

Sorbitane mono-, di- and tri-stearates used in the tests are as follows.
(a) Sorbitane monostearate:
  Sorbon S-60: (Toho Kagaku Kogyo Co.)
  Span 60: (Kao-Atlas Co.)
  Alasel 60: (Kao-Atlas Co.)
(b) Sorbitane distearate:
  Emusol 320: (Kao-Atlas Co.)
(c) Sorbitane tristearate:
  Span 65: (Kao-Atlas Co.)

FIG. 1 shows orientation degrees and rates of troubles (in running) of magnetic tapes obtained by the example.

The upper part of FIG. 1 shows rates of troubles in the running of the magnetic tapes by a car stereo recorder in the condition at 60° C. and 70% of relative humidity for 1 week. The lower part of FIG. 1 shows orientation degrees of the magnetic tapes.

In Figures, the unit of PHR means percents of sorbitane mono-, di- and tri-stearates to the binder.

REFERENCE

Figure 2:
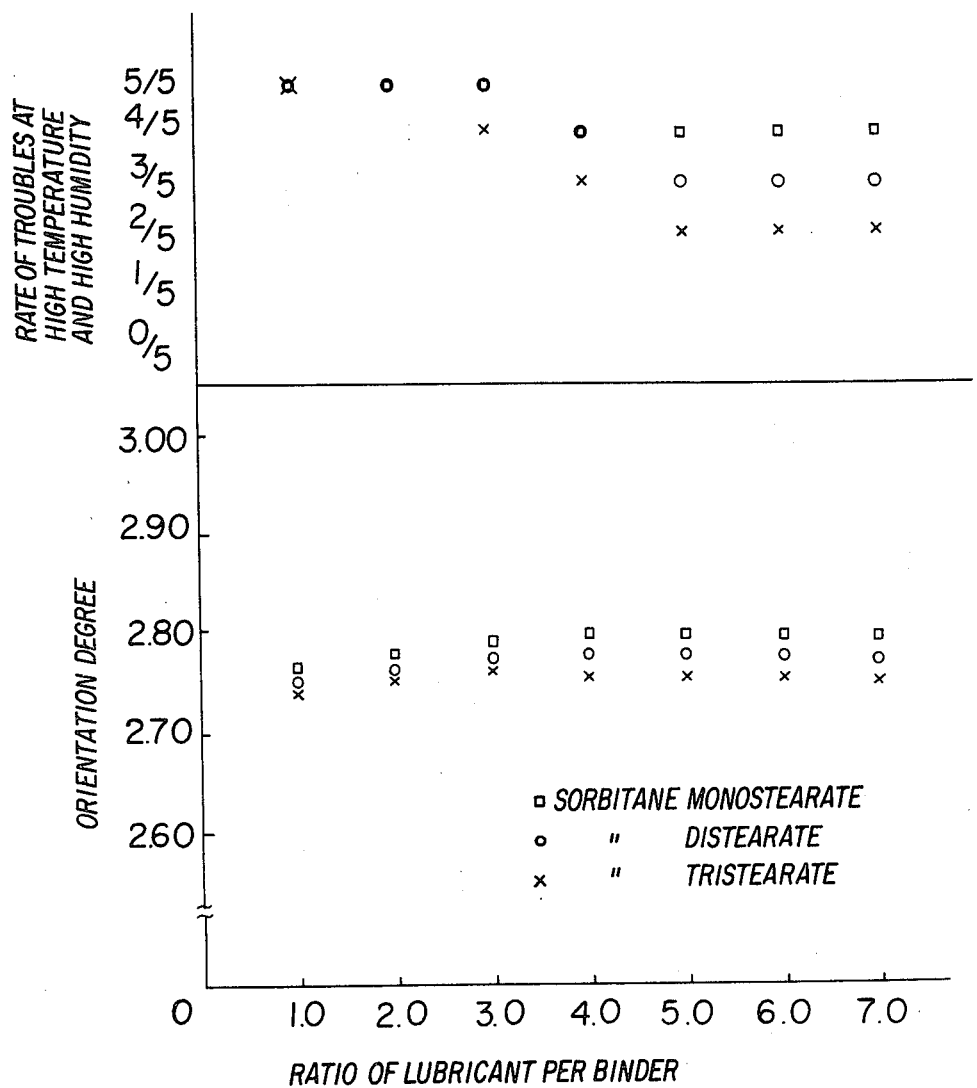
FIG. 2 shows orientation degrees and rates of troubles of the magnetic recording media of the comparative references.

Each single kind of sorbitane mono-, di- or tri-stearate was incorporated in each of Compositions A to D at ratio shown in FIG. 2, and each magnetic tape was prepared by the same process as that of Example. The sorbitane stearates are the same as those of Example.

FIG. 2 shows orientation degrees and rates of troubles (in running) of magnetic tapes obtained by the reference.

As it is clear from FIGS. 1 and 2, when the mixtures of sorbitane mono-, di- and tri-stearates are used as the lubricant, the orientation degrees are remarkably higher and rates of troubles in running at high temperature and high humidity are remarkably smaller in comparison with those of the magnetic tapes prepared by using only single sorbitane mono-, di- or tri-stearate.

When the ratios of sorbitane mono-, di- and tri-stearate to the binder are respectively in a range of about 2 to 3 wt.%, the rate of troubles is substantially zero and the orientation degree can be 2.95. Excellent effect of the combination of sorbitane mono-, di- and tri-stearate has been found.

In accordance with the magnetic recording medium of the present invention, the magnetic powder, the thermosettable binder and the mixture of sorbitane mono-, di- and tri-stearate are mixed to disperse the magnetic powder and the resulting magnetic composition is coated on the substrate, thereby providing the magnetic recording medium having remarkably high orientation degree and remarkably high running stability in a severe environment at high temperature and high humidity.

We claim:

1. A magnetic recording medium which comprises a substrate coated with a magnetic layer comprising a magnetic powder, a thermosettable binder and a mixture of sorbitane mono-, di- and tri- higher fatty acid ester surfactants, the ratio in said mixture being 1:0.2–5:0.2–5, and the ratio of said mixture to said binder being from 1–15 wt.%.

2. The magnetic recording medium according to claim 1 wherein the ratio of said mixture to said binder is from 2–10 wt.%.

3. The magnetic recording medium according to claim 1 wherein said surfactants are a mixture of sorbitane monostearate, sorbitane distearate and sorbitane tristearate.

4. The magnetic recording medium according to claim 1 wherein said thermosettable binder comprises a resin having hydroxyl groups and a polyisocyanate as a crosslinking agent.

* * * * *